United States Patent Office

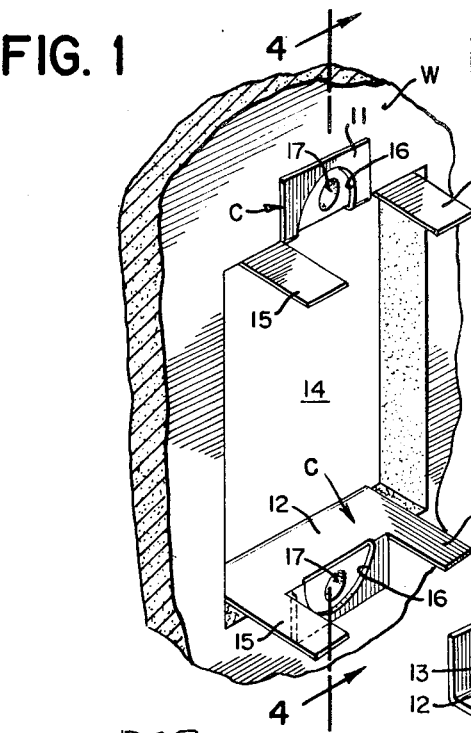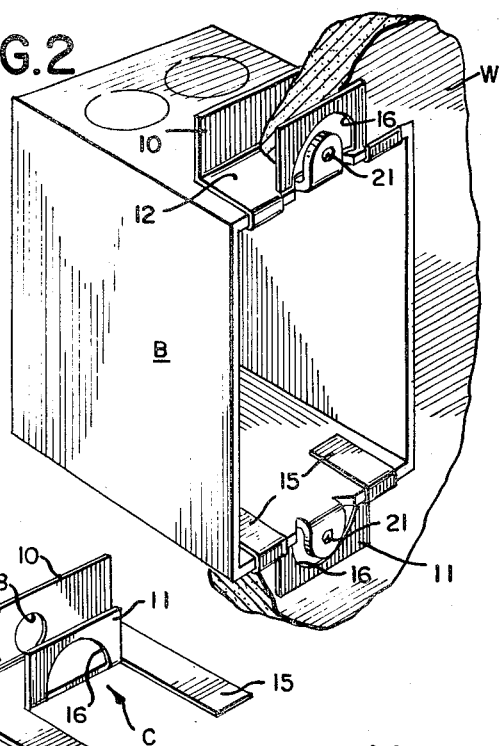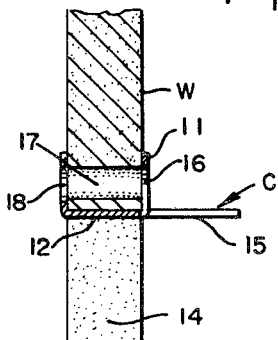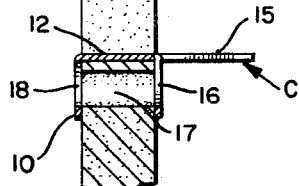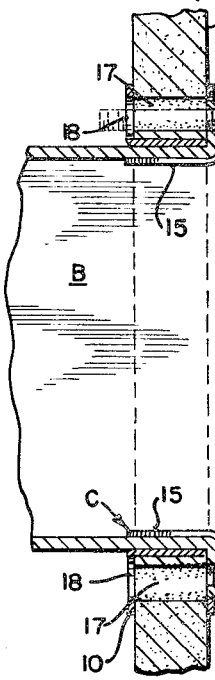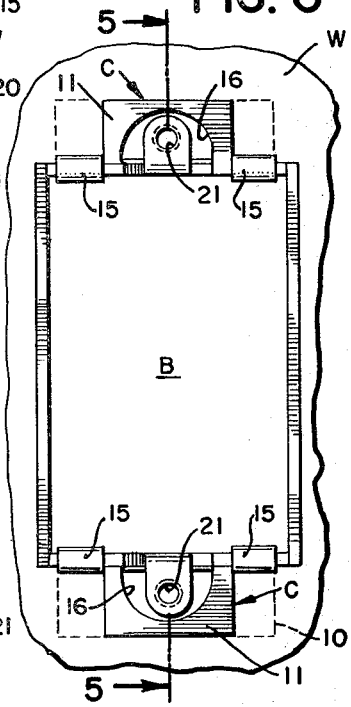
INVENTOR
HERBERT GINSBURG, BY
S. Stephen Baker, attorney.

3,362,667
Patented Jan. 9, 1968

3,362,667
ELECTRIC SWITCH BOX SUPPORTS
Herbert Ginsburg, 108—20 180th St.,
Jamaica, N.Y. 11433
Filed May 20, 1966, Ser. No. 551,581
2 Claims. (Cl. 248—27)

ABSTRACT OF THE DISCLOSURE

A metal clip for attaching electrical switch or outlet boxes to a prepared wall opening of a structure, the clip being formed with a channel which can be pressed against the edge of the wall opening to support the clip, and the channel walls having communicating openings for final installation of the box by a screw penetrating the conventional threaded connecting lug of the box as well as traversing through an edge of the wall opening and through both communicating openings on respective sides of the wall edge. The clip also has normally forwardly extending front feet which are bent around the box wall for initially holding the box in position before the screw is applied.

---

This invention relates to electric switch box supports and more particularly to a clip for connecting an electric switch box to an opening formed in a wall or other structure.

My device provides simplified means for first connecting a pair of clips to the wall opening and thereafter for connecting the switch box to the clips. The clips are further formed as to permit usage of the conventionally threaded ear or lug of the switch box for installing the electrical component.

Summarizing the invention, it comprises a metal clip for attaching electrical switch or outlet boxes to a prepared wall opening of a structure. The clip comprises a front wall, a rear wall, and a floor, the front and rear walls opposing each other to form a channel for initially embracing edge portions of the prepared wall opening so as to support the clips at said wall opening. The two opposing clip walls are formed with communicating openings, one of said communicating openings accommodating the conventional threaded connection lug of the box, while the other communicating opening can receive a threaded screw penetrating said lug. The clip includes a pair of bendable feet normally extending outwardly from said floor at respective sides of said clip front wall so that the feet can be bent around the box wall to secure the clip to the box and hold the box in position. Thereafter the threaded screw is installed through the connection lug of the box, through the structure wall, and through said other communicating opening of the clip wall to complete the installation. Of course, two such clips are usually employed at respectively opposite edges of the wall opening of the structure.

The invention will be further understood from the following description and drawings wherein:

FIGURE 1 is a perspective view of the two clips as applied to a structure wall opening;

FIGURE 2 is a perspective view showing the installation of the electric switch box;

FIGURE 3 is a perspective view of one clip before it is applied to the wall opening;

FIGURE 4 is a cross-sectional view as taken along the line 4—4 of FIGURE 1;

FIGURE 5 is a cross-sectional view similar to FIGURE 4, but showing the attachment of the switch box thereto, and as taken along the line 4—4 of FIGURE 5; and FIGURE 6 is a front elevational view of the finished installation.

The clip C comprises a one-piece metal body having vertical or upstanding walls 10 and 11, spaced by integral floor 12, so as to form a channel 13 which serves to firmly embrace the upper or lower edges of the structure wall opening 14. The clip is preferably formed of bendable metal, e.g., thin sheet steel of about .020" thickness. Front wall 11 is about ½ the width and is centered in respect to rear wall 10 so as to leave normally outwardly extending feet 15 on either side of front wall 11 and normally perpendicular thereto as illustrated in FIGURE 1. In preparing to install the switch box, a rectangular opening 14 is first cut in the structure wall which is usually plaster board or the like.

When upper and lower clips C are applied to the respective upper and lower sides of structure wall opening 14 as shown in FIGURE 1, the opening is then prepared to receive the switch or outlet box. First, it will be observed that the structure opening side walls W are received between the clip walls 10 and 11, which may be pressed together by hand or by pliers or the like to grasp the wall W. Clip front wall 11 is formed with an inverted U-shaped cut-out 16 which, as explained hereinafter, accommodates the conventionally threaded connection lug of the switch box. After the two clips are applied as illustrated in FIGURE 1, a hole 17 may be formed through the wall W, the electrician usually pushing an ice pick or the like through the wall. It will also be noted that clip rear wall 10 is formed with an opening 18 in alignment with formed hole 17 so as to be communicating with U-shaped cut-out 16.

After the pair of clips C have been applied as above set forth, the switch box B is deposited in opening 14 so that the front edges of the box B are flush with the surface of structure wall W as illustrated in FIGURE 2. At this time, feet 15 are bent around the respective upper and lower walls of the box B. Such bending may be done manually or by a suitable tool. The box B is thus securely grasped in place by the bent feet 15.

When a switch or receptacle is installed as is conventional, a screw 20, is screwed into threaded lug 21 which is a conventional part of box B. Screw 20 traverses cut-out 16, formed hole 17, and further penetrates through rear wall opening 18.

It will be observed that the installation may be very quickly completed, it being only necessary to press the clips in place, insert the box and bend over the feet. The switch box will then be securely anchored and it will be prevented from being pushed into or pulled out of the structure wall. Thereafter, of course, the switch or receptacle is installed and wired into the box.

I have shown a preferred embodiment of my invention, but it is obvious that numerous omissions and changes may be made without departing from its spirit.

What is claimed is:

1. A switch box attachment clip comprising a sheet metal body having a rear upstanding wall, a front upstanding wall, and an integral floor which separates said walls and forms a structure wall receiving channel whereby said clip walls may be pressed against the edges of a structure wall opening, bendable foot means normally extending outwardly from said floor and from said front wall whereby said foot means may be bent inwardly to secure a switch box in said structure wall opening, said foot means comprising a pair of elongated feet respectively disposed adjacent either side of said clip front wall, said clip front wall being substantially half the width of said clip rear wall and being centered in respect thereto, said clip front wall having a first opening formed therethrough to accommodate a threaded lug of said switch box, and said clip rear wall being formed with a second opening communicating with said first opening whereby a threaded screw may be introduced through said first and second openings.

2. A switch box attachment according to claim 1 and wherein said first opening is of inverted U-shape.

References Cited

UNITED STATES PATENTS

| 1,702,986 | 2/1929 | Wiebmer. | |
| 1,828,064 | 10/1931 | Paine. | |
| 1,847,169 | 3/1932 | Buchanan | 220—3.6 XR |
| 3,268,189 | 8/1966 | Ducharme | 248—27 |

JOHN PETO, *Primary Examiner.*